United States Patent [19]
Schiesser

[11] 3,957,411
[45] May 18, 1976

[54] MOLD

[75] Inventor: Walter Hugo Schiesser, Zurich, Switzerland

[73] Assignee: Schiesser AG, Zurich, Switzerland

[22] Filed: July 15, 1975

[21] Appl. No.: 596,058

[30] Foreign Application Priority Data
Aug. 21, 1974 Switzerland.................... 11400/74

[52] U.S. Cl.......................... 425/215; 425/DIG. 42; 249/52
[51] Int. Cl............................ B29c 11/00; B29h 3/06
[58] Field of Search ............. 249/52; 425/215, 406, 425/DIG. 42

[56] References Cited
UNITED STATES PATENTS

| 879,363 | 2/1908 | Cheney | 425/215 |
|---|---|---|---|
| 2,148,079 | 2/1939 | Martin | 425/DIG. 42 |
| 2,354,241 | 7/1944 | Anderson | 425/DIG. 42 |
| 2,731,669 | 1/1956 | Talalay | 425/215 |
| 2,913,767 | 11/1959 | Simon | 425/DIG. 42 |
| 2,976,575 | 3/1961 | Daubenberger | 425/DIG. 42 |
| 3,406,430 | 10/1968 | Furstenburg et al | 425/DIG. 42 |

*Primary Examiner*—J. Howard Flint, Jr.
*Attorney, Agent, or Firm*—Edward J. Brenner

[57] ABSTRACT

A mold for fabricating articles formed of a fluent material, especially rubber, comprising at least two mold parts enclosing a mold compartment. One of the mold parts possessing a tear or break groove at the region of the mold parting plane, the tear groove surrounding the mold compartment. The tear groove provided in said one mold part has an inner wall which is located exactly opposite the marginal or outer rim of the mold compartment formed in the other mold part and encloses an angle of about 90° or less with the mold parting plane.

9 Claims, 3 Drawing Figures

MOLD

BACKGROUND OF THE INVENTION

The present invention relates to a new and improved construction of mold for fabricating articles or the like —hereinafter simply conveniently referred to as articles— from a fluent or flowable material, especially rubber, and which mold is of the type comprising two mold parts or components enclosing a mold compartment or cavity, one of the mold parts possessing at the region of the mold separation or parting plane a tear or break groove surrounding the mold compartment.

During the fabrication of articles from fluent materials, especially rubber, a greater amount of material must be supplied into the mold than needed for the production of the article in order to insure that the mold compartment will be always completely filled with the molding material without the inclusion of air. During venting of the mold the air inclusions escape out of the mold compartment and thus also excess material into the so-called break or tear groove or overflow groove which is always needed. The transition between the mold compartment and the tear groove should be as thin as possible in order to insure that following removal of the fabricated article from the mold the material which has collected in the tear or overflow groove can be easily removed from the article.

It is generally conventional practice to arrange the tear or break groove in the same mold part or component where there is at least predominantly also arranged the mold compartment. The tear groove normally has a triangular cross-sectional configuration, and hence, its inner wall forms an obtuse angle with respect to the mold parting or separation plane, i.e., an angle exceeding 90°. Owing to this configuration the marginal rim or outer edge of the mold compartment is surrounded by an acute-angle converging collar. The apex or tip of this collar is extremely susceptible to damage. Such damage, which for instance can appear in the form of notches or indentations at the tip of the collar, is however extremely undesirable since it increases the thickness of the connection to the material in the tear groove and either renders difficult or impossible a uniform tearing or breaking-out of the ring of material collected in the tear or break groove. It is for this reason that a special working step is needed for tearing away the material in the tear groove, requiring the services of additional personnel.

With the heretofore known molds the molding material, after filling the tear groove of triangular cross-sectional configuration, can flow between both of the mold parts or components and thus vulcanize up to a thickness of 1 millimeter or more. Separation of the excess material from the actual molded article is then no longer possible without resorting to the aid of auxiliary means. Additionally, the escaping material is of varying thickness depending upon the temperature of the mold and the flow properties of the molded material. This requires a comparatively large proportion of excess material and thus material losses. Moreover, since the material does not flow out uniformly to all sides it should be apparent that at the parting plane of the mold there are formed at different locations different material thicknesses, resulting in canting of the mold parts with respect to one another. The large forces which are thus effective can bend the guide pins, dowels or guide sleeves or the like of the mold parts or damage the same, resulting in inaccurate centering of the mold parts relative to one another, so that the guide pins- or sleeves oftentimes must be replaced.

SUMMARY OF THE INVENTION

Hence, it is a primary object of the present invention to provide an improved construction of mold which is not associated with the aforementioned drawbacks and limitations of the state-of-the-art mold constructions noted above.

Another and more specific object of the present invention aims at the provision of a new and improved construction of mold for the fabrication of articles from fluent materials which avoids the aforementioned drawbacks and which mold is relatively simple in construction and design, economical to manufacture, and extremely reliable in the production of high quality and accurately molded articles.

Now in order to implement these and still further objects of the invention, which will become more readily apparent as the description proceeds, the mold of this development is manifested by the features that the inner wall of the break or tear groove formed in the one mold part is located exactly oppoiste i.e., in coincidence with, the marginal or outer rim or edge of the mold compartment formed in the other mold part and encloses an angle of 90° or less with the mold parting or separation plane.

According to a preferred constructional manifestation of the invention, the mold compartment and the tear groove, respectively, can be surrounded by a recovery or recuperation chamber which can be advantageously arranged in the other mold part i.e., not in the mold part containing the tear groove and located in spaced relationship from such tear groove.

Both of the mold parts, during closing of the mold, press against one another over a relatively small region of the mold parting plane, namely at an overlapping region between the tear or break groove and the recovery chamber. The pressure prevailing in this overlapping region is considerably increased in comparison to conventional molds, assuming that there is present the same closing force. Owing to this increased mold closing pressure or force the spacing between both mold parts is always small and always maintained the same, this also being so because there is present a short flow path for the molding material and does not permit of vulcanization of such material.

With the mold of this invention it is thus possible to fabricate articles with greater precision and uniformity. Moreover, when utilizing the mold of this development a saving in material is possible, and specifically in practice there can be saved between 5% and 10% of the molding material because there is less waste and thus a better utilization of the material.

The edges of the marginal or outer rim of the mold compartment and the break or tear groove, and which edges in the ideal case carry out a grinding or shearing action, maintain the thickness of the connection portion or section between the article to be molded and the material in the tear groove at a minimum, so that removal of the material collected in the tear groove is easily possible upon removal of the article out of the mold insofar as such excess material has not already itself detached from the mold during the time that the article is removed out of the mold. Hence, there is saved a working step for this purpose. Seams, as such appear with the conventional molds at the articles formed therein at the mold parting plane, are reduced to a hardly perceivable degree when using the mold of the present invention, so that articles produced with the inventive mold possess an improved appearance.

Finally, there is practically not possible any canting or tilting of the mold parts when using the mold of the present invention since the mold parts can not be displaced out of their essentially parallel position due to a non-uniform escape of molding material at different locations. Consequently, there is markedly reduced damage and wear of the guide pins or guide sleeves or the like.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
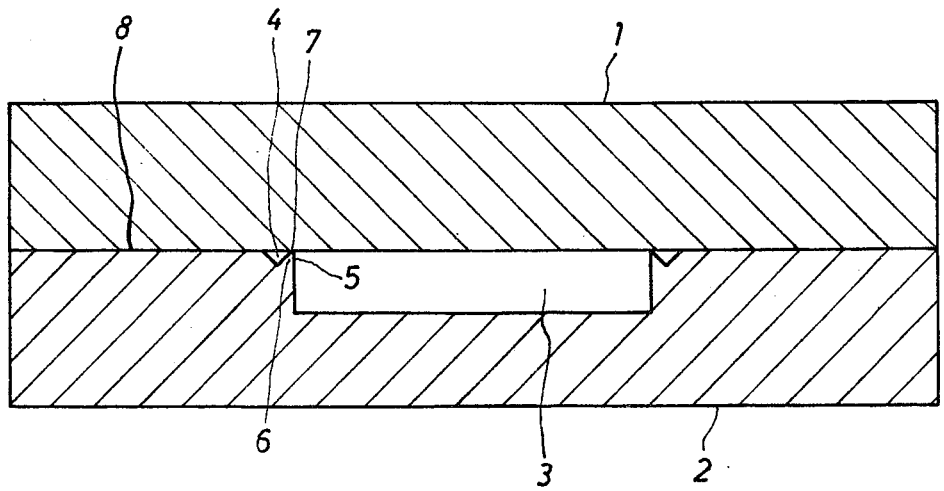
FIG. 1 is a cross-sectional view of a prior art mold.

Describing now the drawings, the prior art mold shown in FIG. 1 comprises a mold upper part or component 1 and a mold lower part or component 2 in which there is formed, for instance, a cylindrical mold compartment or cavity 3. Further, in the mold lower part 2 there is formed a so-called break or tear groove 4 of substantially triangular cross-sectional configuration and which surrounds the mold compartment 3. Between the marginal or outer rim or edge 5 of the mold compartment 3 and the break or tear groove 4 —hereinafter simply referred to as the tear groove— there is thus formed an acute angle collar 6, the apex or tip 7 of which is approximately located in the mold separation or parting plane 8 of both mold parts 1 and 2.

When working with this prior art mold excess molding material escaping out of the mold compartment 3 is pressed over the apex or tip 7 defining a knife edge into the tear groove 4. It should be apparent that if there are formed indentations or notches at the collar apex or tip 7 or if the latter otherwise becomes damaged, then there can form material connection portions between the molding material located in the mold compartment 3 and in the tear groove 4 which renders more difficult the breaking or tearing away of the excess material collected in the tear groove 4 from the article produced in the mold compartment 3. Also it should be apparent that material can easily penetrate past the tear groove 4 into the mold parting plane 8 between the mold part 1 and the mold part 2 because the pressure in the mold parting plane 8 produced by virtue of the mold closing force is distributed over a relatively large overlapping surface and is correspondingly small. This results in the formation of unattractive seams at the molded articles and to unnecessary excessive consumption of molding material because there is lost a great deal of excess material, and finally in undesired loading of the not particularly illustrated guide components between both of the mold parts 1 and 2 owing to the irregular escape of material over the periphery of the mold.

The description of the prior art mold of FIG. 1 has been given in order to be able to appreciate the construction of the new and improved mold structure of this development and the advantages attained thereby as noted heretofore. As a matter of convenience, with the mold of this development, as shown in FIGS. 2 and 3, functionally equivalent components have been generally designated by the same reference characters.

Figure 2:
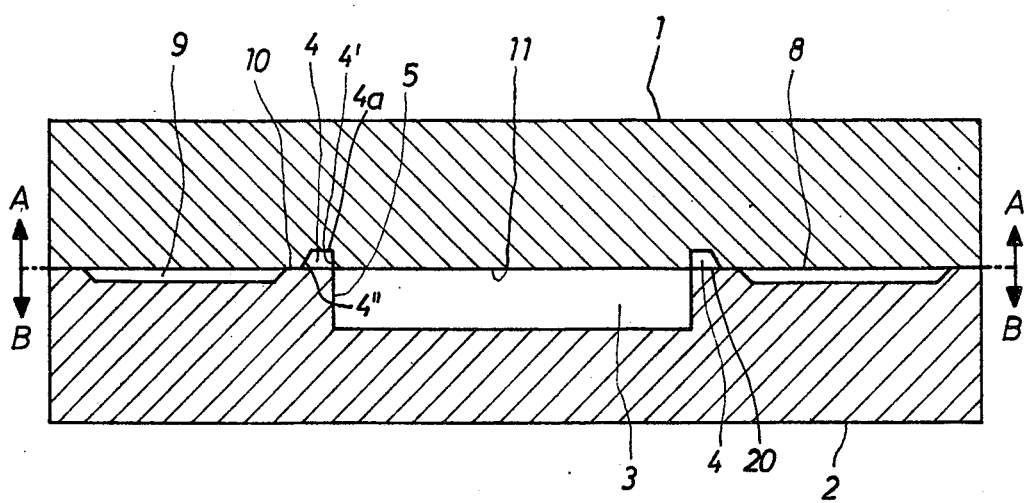
FIG. 2 is a cross-sectional view of a mold constructed according to the present invention.
Figure 3:
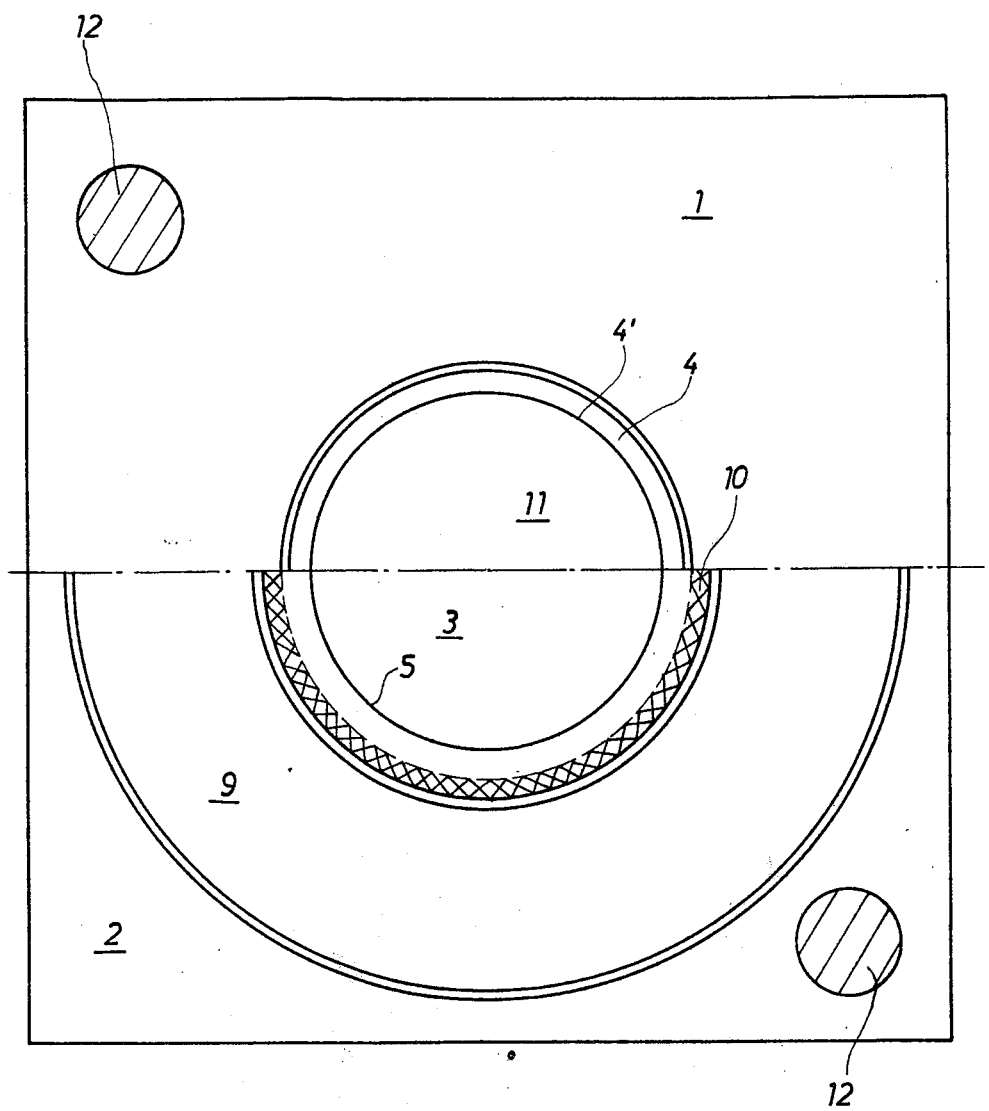
FIG. 3 is a sectional view of the mold shown in FIG. 2 wherein the upper half thereof is a section taken along the line B—B of FIG. 2 and the lower half a section taken along the line A—A of FIG. 2.

Just as was the case for the conventional prior art mold of FIG. 1 also with the mold of the present invention as shown in FIGS. 2 and 3 the mold compartment or cavity 3 is completely formed in the lower mold part or component 2. However, it should be appreciated that the mold compartment 3 could be extended into the mold upper part 1.

In contrast to the prior art mold, in this case, however, the tear groove 4 or equivalent structure is arranged in the mold upper part 1. According to the showing of FIG. 2, the cross-section of the tear groove 4 is essentially trapezoidal, and the base or bottom 4a thereof is essentially parallel to the mold parting plane 8. The inner wall 4' of the tear groove 4 is disposed at an angle of 90° with respect to the mold parting plane 8 and coincides with the substantially hollow cylindrical wall or marginal edge 5 of the mold compartment 3 and which wall 5 likewise extends at an angle of substantially 90° with respect to the mold parting plane 8. The outer wall 4'' of the tear groove 4 is inclined at an angle less than 90° with respect to the mold parting plane 8.

A recuperation or recovery chamber 9 is provided in the mold lower part 2 radially outside of the tear groove 4. This recovery chamber 9 possesses a very large width and smaller depth in contrast to the corresponding dimensions of the tear groove 4 and annularly surrounds both the tear groove 4 as well as the mold compartment 3. Between the recovery chamber 9 and the tear groove 4 there is formed a substantially ring-shaped or annular overlapping region 10 of small width — this overlapping region 10 being shown cross-hatched in FIG. 3 to improve the illustration thereof— by means of which there is primarily supported the closure or closing force between both mold parts 1 and 2. The pressure in this overlapping region 10 is thus large and insures that excess material possibly escaping out of the tear groove 4 can only escape in a very uniform manner and with an extremely small thickness. Moreover, by virtue of the small width of the overlapping region 10 there is insured that there cannot occur at such region any vulcanization of the molding material and thus also no build-up of an impermissible material layer thickness. Hence, the consumption of excess material is thus virtually limited to the volume of the tear groove 4. There is also eliminated an irregular or non-uniform lift-off or raising of the mold upper part 1 from the mold lower part 2 and the therewith associated bending loading of the guide pins or dowels indicated by reference character 12 (FIG. 3) between the mold parts 1 and 2 which in the showing of FIG. 2 are movable relative to one another in vertical direction in the plane of the drawing. This overlapping region 10 is part of a substantially annular surface 20 which covers the tear groove 4 and is provided between the marginal rim 5 of the mold compartment 3 and the recovery chamber 9.

Owing to the meshing or grinding edges which the inner wall 4' or the tear groove 4 and the substantially cylindrical wall 5 of the mold compartment 3 form with respect to the mold separation or parting plane 8, it is practically no longer possible for there to be formed a visible seam at the molded article at the region of the mold parting plane.

With the illustrated exemplary embodiment of mold, the inner wall 4' of the tear groove 4 encloses an angle of 90° with the mold parting plane 8. This angle also can amount to less than 90°. Consequently, there is formed an obtuse angle between the circular surface 11 enclosed by the tear groove 4 and located in the mold parting plane 8 and the inner wall 4'. The apex region of this angle is by far no longer as susceptible to damage as the tip or apex 7 of the collar 6 of the prior art mold discussed above.

It is again stressed that with the inventive construction of mold there is not formed a surface at the actual closing parts or components, rather a line. At that location the material can flow through more easily and without encountering any appreciable resistance, so that the mold is also not opened and, furthermore, there does not remain any protruding edge when there is torn away the vulcanized piece coming out of the tear groove. The molded part at that moment is completely clean.

As already alluded to above, the recovery chamber on the one hand, permits the application of a larger closing force to the mold since the contact surfaces are smaller and, on the other hand, the rubber material flowing out of the hollow mold compartment for the molded article cannot vulcanize in the short path where it flows through at the top and bottom between the two mold parts and force apart the two mold parts. If vulcanization of the material takes place as it flows into the recovery chamber, then such is of no effect since by virtue of such recovery chamber there cannot come into play any force opposing the closing force of both mold parts. This opposing force of the gradually vulcanized material is expended within the empty recovery space of the recovery chamber.

While there is shown and described present preferred embodiments of the invention, it is to be distinctly understood that the invention is not limited thereto, but may be otherwise variously embodied and practiced within the scope of the following claims. Accordingly,

What is claimed is:

1. A mold for fabricating articles formed of a fluent material, especially rubber, comprising at least two mold parts enclosing a mold compartment, said at least two mold parts being separable from one another at a mold parting plane, one of the mold parts being provided at the region of the mold parting plane with a tear groove surrounding the mold compartment, the other of the mold parts being provided with said mold compartment, said mold compartment having a marginal rim, said tear groove having an inner wall, the inner wall of the tear groove being located exactly opposite the marginal rim of the mold compartment and enclosing an angle of about 90° or less with the mold parting plane.

2. The mold as defined in claim 1, wherein both the inner wall of the tear groove has an edge and the marginal rim of the mold compartment has an edge formed at the mold parting plane which exactly coincide with one another.

3. The mold as defined in claim 1, further including a recovery chamber surrounding the tear groove.

4. The mold as defined in claim 1, further including a recovery chamber surrounding the mold compartment.

5. The mold as defined in claim 4, wherein the recovery chamber possesses a large width and lesser depth in relation to the corresponding dimensions of the tear groove.

6. The mold as defined in claim 4, wherein the recovery chamber is located at said other mold part and is arranged in spaced relationship from the tear groove.

7. The mold as defined in claim 6, wherein a substantially annular surface is provided between the marginal rim of the mold compartment and the recovery chamber at the region of the mold parting plane, said annular surface covering the tear groove and forming an overlapping region at which there is at least predominantly supported the mold closing force.

8. The mold as defined in claim 1, wherein the inner wall of the tear groove is disposed at an angle of approximately 90° to the mold parting plane and the outer wall of the tear groove is inclined at an angle less than 90° with respect to the mold parting plane.

9. The mold as defined in claim 1, wherein the tear groove has a base extending substantially parallel to the mold parting plane.

* * * * *